Sept. 15, 1931.  A. VAN DUYN  1,823,415

SCALE

Filed April 11, 1929  2 Sheets-Sheet 1

Inventor:
Adrianus van Duyn
By Chas. M. Niasen
Atty.

Sept. 15, 1931.  A. VAN DUYN  1,823,415
SCALE
Filed April 11, 1929   2 Sheets-Sheet 2

Patented Sept. 15, 1931

1,823,415

UNITED STATES PATENT OFFICE

ADRIANUS van DUYN, OF ROTTERDAM, NETHERLANDS, ASSIGNOR TO NAAMLOOZE VENNOOTSCHAP MAATSCHAPPIJ TOT VERVAARDIGING VAN SNIJMACHINES VOLGENS VAN BERKEL'S PATENT EN VAN ANDERE WERKTUIGEN, OF ROTTERDAM, NETHERLANDS, A LIMITED LIABILITY COMPANY OF THE NETHERLANDS

SCALE

Application filed April 11, 1929, Serial No. 354,217, and in Great Britain July 19, 1928.

This invention relates to scales and has for one of its objects the placing of the knife edges on the weigh-beam in such a position that the knife edges thereof are above the body portion of the weigh-beam when the beam is located in the scales.

Another object of this invention is to space the knife edges as far as possible from the French stays used to give parallel motion to the scale pans and at the same time to keep down the height of the casing enclosing the weigh-beam and French stays so that it will not be any higher than in scales having the weigh-beam outside of the casing proper, the object being to prevent dust and dirt from accumulating on the weigh-beam and knife edges by enclosing them within the casing and at the same time not making the casing any heavier by having to make it higher or to mar its appearance by a casing member which appears to be too heavy for the remainder of the scales.

Another object of this invention is to keep the dust and dirt from entering the openings through which the knife edges protrude to support the scale pans.

Other objects of the invention will appear hereinafter, the novel features and combinations being set forth in the appended claims.

In the drawings:—

Figures 1, 3:
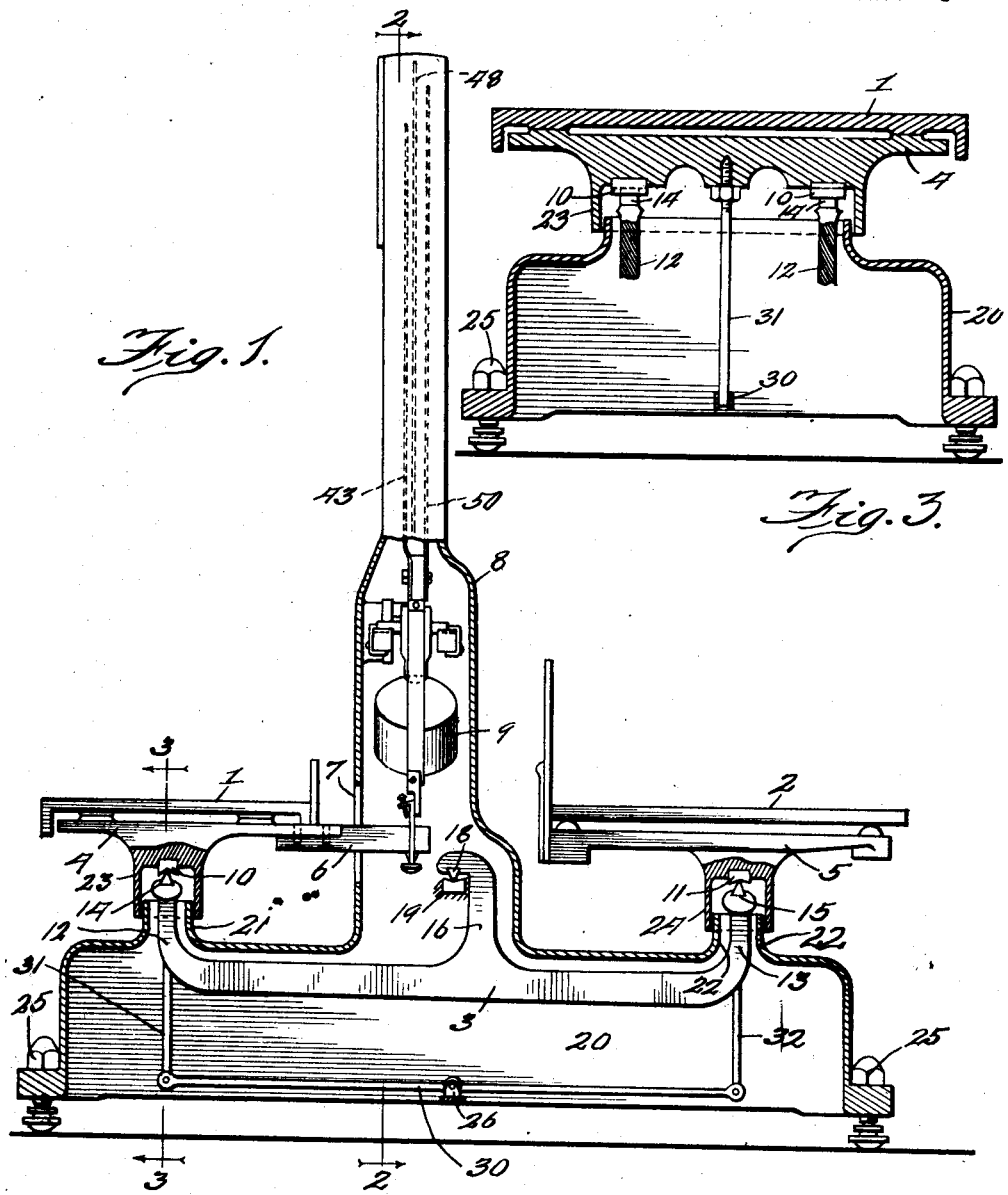
Fig. 1 is a view partially in section of a scale embodying my invention.
Fig. 3 is a cross-section on the line 3—3 of Fig. 1.

A scale pan 1 which is adapted to support weights in a well-known manner is supported on one end of each of the identical weigh-beams 3 by means of the knife edges 14 engaging the bearings 10 mounted on the support 4 for the scale pan. Mounted on the other ends of the weigh-beams 3 is a scale pan 2 adapted to receive the goods to be weighed and this is supported by means of the knife edges 15 engaging the blocks 11 on the support 5 for the scale pan 2. The beams themselves are each pivotally supported by means of a knife edge 18 engaging a block 19 made integral with the casing member 8. The knife edges 14, 18 and 15 are mounted in the ends of extensions 12, 16 and 13, respectively, on the beams 3. This arrangement places all of the knife edges above the body portions of the beams 3. A single beam with forked ends may be used in place of two beams if desired. The forked ends would correspond to the extension 12 at one end and 13 at the other end.

Figure 2:
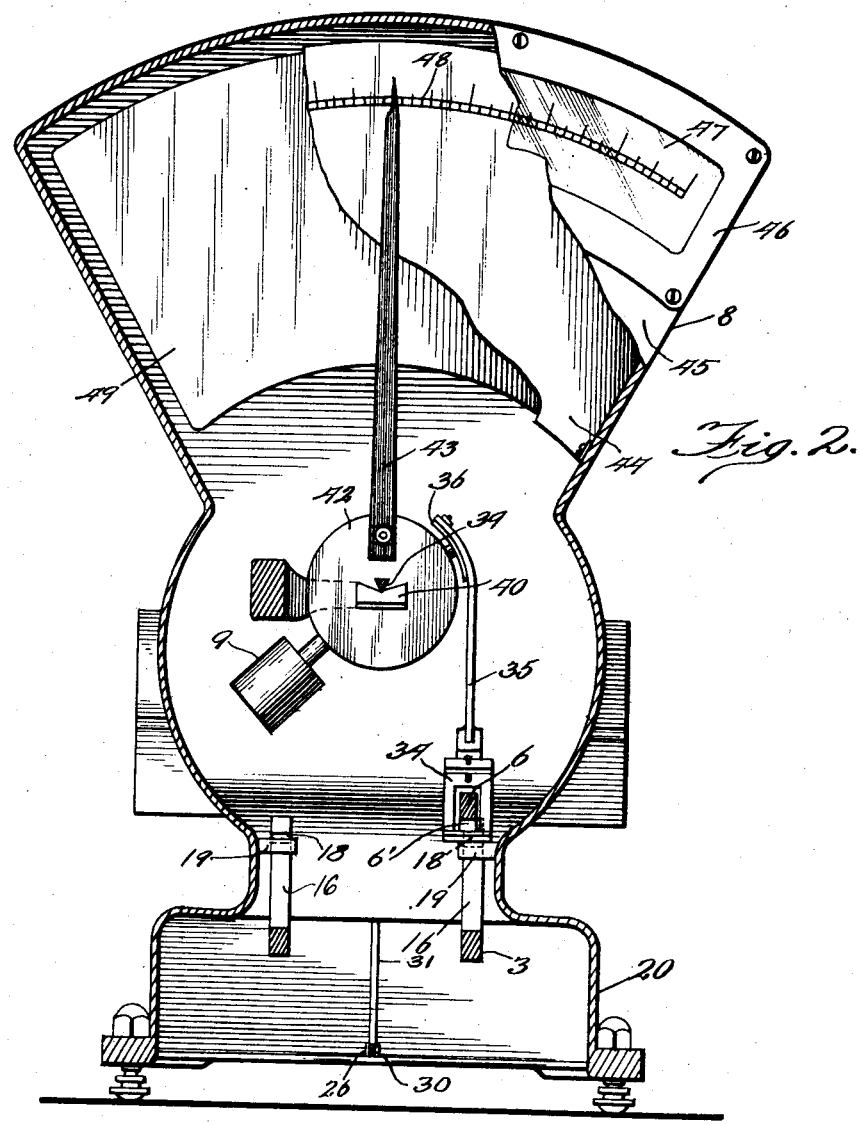
Fig. 2 is a cross-section on the line 2—2 of Fig. 1.

In order to keep the scale pans 1 and 2 always in a horizontal position it is necessary to have some sort of a parallel motion arrangement to move the pans in this manner. In the present instance, two rods 31 and 32 are screw-threaded into the supports 4 and 5, respectively, in the manner illustrated in Fig. 3. A rod 30, commonly called a French stay, has its opposite ends pivoted to the rods 31 and 32 and being pivoted intermediate its ends on a support 26 integral with the casing member, as shown in Fig. 2, this latter pivot being located below and in a vertical plane through the knife edges 18.

Similarly the pivotal connections between the member 30 and members 31 and 32 are located beneath and in a vertical plane through the knife edges 14 and 15. This insures that the scale pans will always move with their upper faces in parallel planes since the rods 31 and 32 always remain in a vertical position due to the arrangement described. The weigh-beams and the parallel motion arrangement just described are all housed within the base member 20 of the scale casing 8, except the portions which extend upwardly above the bosses 21 and 22.

Some means are necessary to keep dust and dirt from entering the openings formed by the bosses just mentioned and for this purpose the scale pan supports 4 and 5 are provided with downwardly extending members 23 and 24, respectively, which loosely surround the bosses 21 and 22, but at all times in the operation of the scales remain in overlapping relation therewith so that the possibility of dust and dirt entering through the openings formed by the bosses 21 and 22 has been substantially eliminated.

The casing 8 is supported by means of adjustable supports 25 mounted in the four corners of the base member 20 and may be of any desired form, such as screw-threaded legs with adjustable feet.

An indicating means is necessary to indicate the weight of an article placed on the goods platform 2 and for this purpose the arm 6 is rigidly attached by means of screws or other suitable fastening means to the support 4 for the scale pan 1 and projects through the opening 7 in the casing 8 and has a knife edge 6' engaging a bearing member on the rectangular-shaped member 34 in a well-known manner. A weight 9 pivoted by means of a knife edge 39 on pivot 40 normally urges the member 34 upwardly against the downward pull of lever 6, the strap 35 passing over the arcuate member 34 which moves about pivot 39 and which is integral with member 42 so as to provide a means whereby the pull of the strap 35 is always exerted at the proper distance from the pivot point 39. Also fastened to the member 42 so as to rotate therewith is a pointer 43 co-operating with the usual scale 48 to indicate the weight of the article being weighed. The scale 48 is on one side of the member 44 and indicates to the customer the weight of the article, whereas on the opposite side of the member 44 is the usual scale for the use of the operator in determining the price of the article being weighed, as well as its weight, and a pointer 50 co-operates with this scale in the usual manner. The casing is fitted with a cover 45 carrying an auxiliary cover plate 46 with a glass 47 therein to make the scale 48 visible and the opposite side of the casing is provided with a glass 49 to make the scale on that side of the member 44 visible to the operator.

The operation of the device is as follows:

The weight of the scale pan 1 is just sufficient to rotate the member 42 through connections 6, 34, 35 and 36 in a clockwise direction against the action of the weight 9 to cause the arm 43 to move to its extreme limiting position to the right, as shown in Fig. 2. The goods to be weighted are then placed upon the scale pan 2 which causes the scale pan 1 to be raised somewhat since the goods counteracts some of the weight of the scale pan 1. This upward movement of the scale pan 1 allows the weight 9 to rotate the member 42 in a counterclockwise direction enough to allow the pointer to indicate on the scale 48 the weight of the goods on the scale pan 2. When the pointer has reached the extreme left position as shown in Fig. 2, additional weights are applied to the platform 1 to bring the pointer back to the right. This weight must then be added to the weight indicated on the scale 48 to get the proper weight of the article being weighed. It will be noted that with this arrangement the knife edges are all enclosed so as to be protected from dust and dirt and that the top of the base member 20 is not any higher than those of the ordinary type of scales wherein the beam is exposed and also that the knife edges 14 and 15 are spaced at a considerable distance from the pivotal connections between the rods 31 and 32 with the member 30. This latter feature is very important as it allows a long leverage 31 to counteract a very comparatively short leverage between the upper surface of the scale pan and the pivotal point 14 which has a tendency to rock the scale pan and thereby destroy its sensibility when the weights, or in the case of scale pan 2, the goods, are not placed with the center of gravity over the pivotal points 14 or 15.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:—

1. In a weighing device, the combination with a pivotally supported weighing beam, of a casing therefor, scale pans outside of the casing pivotally mounted on the weighing beam by means extending through openings in the casing, indicating means for the weighing device enclosed in an extension of said casing, and means for preventing dust, dirt and other foreign matter from entering said casing through said openings, the extension for enclosing said indicating means also enclosing the pivotal support for the weighing beam.

2. In a weighing device, the combination with a pivotally supported weighing beam, of a casing therefor, scale pans outside of the casing pivotally mounted on the weighing beam by means extending through openings in the casing, indicating means for the weighing device enclosed in an extension of said casing, means for preventing dust, dirt and other foreign matter from entering said casing through said openings, and parallel guiding means for always maintaining the scale pans in parallel planes, the extension for enclosing said indicating means also enclosing the pivotal support for the weighing beam.

3. In a weighing apparatus, the combination with a casing, of a weigh-beam pivotally supported within said casing, and scale pans pivotally mounted on said weigh-beam, said mounting being outside of the body portion of said casing and substantially in alinement with the pivotal support for the weigh-beam, said pivotal support for said weigh-beam being within an extended portion of said casing.

4. In a weighing device, the combination with a pivotally supported weigh-beam, of a casing therefor, scale pans outside of the casing and pivotally mounted on the weigh-beam by means extending through openings in the casing, indicating means for the weighing edvice, and an extension in which said indicating means is located, said extension also enclosing the pivotal support for said weigh-beam.

5. In a weighing device, the combination with a pivotally supported weigh-beam, of a casing therefor, scale pans outside of the casing and pivotally mounted on the weigh-beam by means extended through openings in the casing, indicating means for the weighing device enclosed in an extension of said housing, and parallel guiding means for maintaining the scale pans in parallel planes, said extension also enclosing the pivotal support for said weigh-beam.

6. A weigh-beam for weighing apparatus comprising a portion adapted to be arranged in a horizontal position, three upwardly extending portions on said horizontally extending portion, one of said upwardly extending portions carrying a bearing adapted to co-operate with a supporting bearing to support said weigh-beam and the others of which are adapted to co-operate with suitable bearings on scale pans, the bearings on the upwardly extending portions being in substantial alinement with each other, said weigh-beam being adapted to be received within a casing with only the bearing portions which co-operate with the scale pans extending outside of said casing.

In testimony whereof I have signed my name to this specification on this 23rd day of March, A. D. 1929.

ADRIANUS van DUYN.